Dec. 29, 1931.     L. C. BURGARD     1,839,082
MIXER
Original Filed June 26, 1926

Inventor.
LOUIS C. BURGARD
By Arthur E Wallen
Atty.

Patented Dec. 29, 1931

1,839,082

UNITED STATES PATENT OFFICE

LOUIS C. BURGARD, OF LOUISVILLE, KENTUCKY

MIXER

Application filed June 26, 1926, Serial No. 118,812. Renewed October 27, 1930.

This invention relates to mixing devices, and more particularly to a device for mixing compounds for the preparation of molds in dental castings.

This compound used for molds in dental castings contains in general about 25% plaster of Paris. A specific amount of water must be used to produce the highest results and all air must be excluded or removed from the mixture. The plaster of Paris acts as the binder for the moulding compound, hence it is imperative that each particle of plaster becomes saturated with water.

The technician therefore is confronted with two principles, a physical and a chemical, the physical being the thoro mixing of water into this compound; the chemical, that the saturation of the plaster starts a chemical action known as crystallization or hardening of this plaster binder. This crystallization starts immediately after the water comes in contact with the plaster, and if stirring or mixing is continued it is detrimental to said crystallization or chemical action. The usual stirring by hand to get a thoro incorporation of water into the compound consumes such time, which often interferes with this aforementioned chemical action. Hence it is most desirable to produce such mixture in the very minimum of time.

The object of the present invention is a mechanical mixing device for thoroly incorporating water with the compounds in a minimum amount of time.

In this accomplishment of the invention a rubber mixing bowl is provided and a flanged cover therefor, designed to engage the inside rim of bowl making a water tight fit and a top edge or flange limiting the degree of insertion of the cover so the mixing paddle secured to the underside of the cover, which is designed to closely abut the inside wall of the bowl will not bind or drag on inside circumference or walls. Suitable means operated through the cover is provided to transmit a rotating motion to the mixing paddle. The bowl cover, mixing paddle and mixing paddle driving mechanism are designed to form a single unit, apart from the bowl, so that they can be quickly and expeditiously joined to the bowl, instantly operated to get a thoro mixing action, and finally quickly withdrawn from the mixing bowl so that the mixed compound can immediately be employed.

Figure 1:
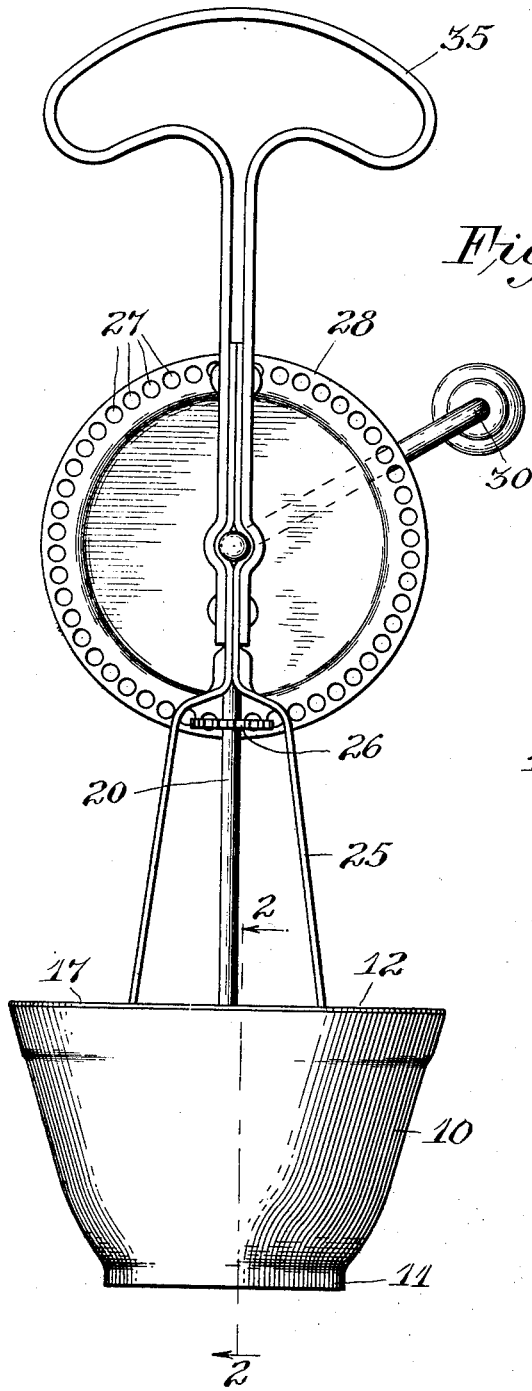
Figure 2:
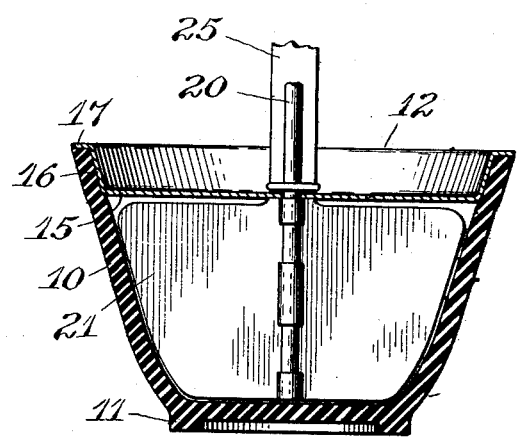

One embodiment of the invention is shown in the accompanying drawings in which:

Figure 1 is an elevational view of a device incorporating the many features of the invention, part of the view being broken away to show the features thereof, and Figure 2 is a sectional view taken on the line 2—2 of Figure 1 looking in the direction of the arrow.

Referring now in detail to the drawings in which like reference characters are employed to designate similar members throughout the several views, a mixing chamber or bowl 10 is provided of suitable collapsible material such as semi-hard rubber which may be suitably reinforced by the inclusion of the usual fabric. The bowl is provided with an annular extension 11 on the bottom thereof to form a flat space to permit standing the bowl in an upright position.

A plate or a cover designated generally by the reference character 12 comprises a circular metal plate 15, an upright portion 16, a peripheral flange 17, the plate 15, upright 16, and peripheral flange 17 being preferably formed from a single piece of metal. The cover plate 15 is made slightly larger in diameter than the mouth of the bowl 10 so as to cause some stretching and expanding of said bowl when said cover is forced into the mouth thereof. As will be noted, the flange 16 on said cover plate is of upwardly flaring tapering form, thereby spreading or expanding the mouth of the bowl as it is forced downwardly therein, as indicated in Fig. 2. The horizontally extending flange 17 constitutes a stop accurately limiting the downward movement of the cover plate and also tightly sealing the joint. In this way a water-tight sealing fit is obtained which will positively prevent escape of water from the bowl during the mixing operation. A hole in the plate 15 at the center thereof permits insertion of a driving rod 20 at the end of which rod and below the plate 15 is secured a bifoliate mixing paddle 21. The driving rod 20 may be secured in position in respect to the plate 15 in any suitable manner as for instance by a bifurcated mounting yoke 25, the bifurcations of which are firmly secured to the plate 15 by welding or riveting, or any other way whereby a uniting structure is obtained.

Any usual means for imparting a rotating motion to the driving shaft 20 may be employed. I have shown an ordinary construction wherein a pinion 26 is integrally mounted on the driving rod 20, the teeth thereof meshing with perforations 27—27 in a circular driving plate 28, suitably mounted and driven as by a handle 30. A stationary handle 35 may also be provided to hold the device during the use thereof. With the arrangement shown it is obvious that the mixing paddle is driven at a greater rate of speed than that at which the handle 30 is turned. This provision as far as I am aware is novel in this class of device, but I have found it, particularly in certain sizes of hand propelled mixers, to be very desirable and productive of optimum results which the user thereof will be very quick to appreciate.

Instead of the manual means for operating the shaft 20 it is obvious that any automatic means may be provided without departing from the spirit and scope of the invention. I have shown a manual drive as being one of the usual operating means with which the mixing device may be equipped.

The bifoliate mixing paddle 21, may be of flat cross section, or its leaves may be preformed to any suitable shape, that of the letter S being particularly good. The paddle should stand very close to the inside walls but without actually touching the same. If it is too far away from the side walls or bottom of the bowl it will result in forming bubbles in the mixing compound, while if it actually touches the inside walls, the friction will be great enough to make the handle 30 hard to turn. As will be observed the paddle 21 is a flat imperforate blade closely conforming in shape to the interior shape of the bowl 10. As has been previously indicated, the flange 17 of the cover plate 15 constitutes a definite stop which accurately positions said blade in the bowl so that its edges closely approach but do not touch the bottom and sides thereof. By making the paddle 21 in the form of an imperforate flat blade all air will be worked out of the mixture during operation and none introduced therein. The manner of positioning the cover portion on the mixing bowl is very advantageous in permitting the close spacing of the mixing paddle without the possibility of making actual contact with the bowl.

It will be seen that the provision of a two unit mixing combination comprising a bowl and a unitary mixing device of the present design is a great time saver for the user thereof, and also results in very good mixing. It is obvious that if desired a number of mixing bowls could be employed, while only a single unitary mixing device would have to be had, the mixer being used seriatim with the bowls. The change from one bowl to another can be accomplished almost instantaneously. I have in mind the use of the device by a dentist and his assistant, as an example to prepare a comparatively large number of inlay molds. A small mixer made in accordance with the present invention could be used with as great saving of time as if a large machine driven device were employed, while at the same time getting better results on account of the small quantity of compound mixed at one time.

While there are many desirable features incorporated in my mixer which have been described in detail herein, I do not wish to be limited except within the scope of the appended claims.

I claim:—

1. A dental device for mixing plaster of Paris or the like, comprising a rubber bowl, a cover for the bowl provided at its periphery with a tapered upwardly flaring wall adapted to have expanding action within the mouth of the rubber bowl for forming a tight joint therewith, a horizontal stop flange secured to the cover at the top of the tapered wall to limit the downward movement of the cover within the bowl, a handle frame carrying the cover which is rigidly attached thereto whereby the cover may be inserted within the rubber bowl by manipulation of the handle frame, a mixing shaft extending through the cover and connected with the handle frame, means mounted upon the handle frame to drive the mixing shaft, and a mixing paddle carried by the lower end of the mixing shaft beneath the cover and adapted to revolve within said bowl and closely conforming in shape and size to the interior of the bowl, the action of the stop flange serving to prevent the paddle from contacting with the inner surface of the mixing bowl.

2. A dental device for mixing plaster of Paris or the like, comprising a rubber bowl, a cover for the bowl provided at its periphery with a tapered upwardly flaring wall adapted to have expanding action within the mouth of the rubber bowl for forming a tight joint therewith, a stop flange secured to the cover at its periphery and near the upper end of the tapered wall to limit the downward movement of the cover within the bowl, a mixing shaft extending through the cover and into the bowl, a mixing paddle carried by the lower portion of the mixing shaft beneath the cover and adapted to revolve within the bowl and conforming generally in shape and size to the interior of the bowl, the action of the stop flange serving to prevent the paddle from contacting with the inner surface of the mixing bowl, and manually operated speed increasing gearing connected with the shaft to drive the mixing paddle.

3. A dental device for mixing plaster of Paris or the like, comprising a rubber bowl, a cover for the bowl provided at its periphery with a tapered upwardly flaring wall adapted to have expanding action within the mouth of the rubber bowl for forming a tight joint therewith, a stop flange secured to the cover at its periphery and near the top of the tapered wall to limit the downward movement of the cover within the bowl, a mixing shaft extending through the cover, a flat mixing paddle carried by the lower portion of the mixing shaft beneath the cover and adapted to revolve within said bowl and conforming generally in shape and size to the interior of the bowl, the action of the stop flange serving to prevent the paddle from contacting with the inner surface of the mixing bowl, and manually operated speed increasing gearing connected with the mixing shaft to drive the same.

4. A dental device for mixing plaster of Paris or the like, comprising a rubber bowl, a cover for the bowl having its periphery adapted to have a tight fit within the mouth of the rubber bowl, a stop flange secured to the cover at its periphery to limit the downward movement of the cover within the bowl, a mixing shaft extending through the cover and leading into the bowl, an imperforate straight mixing paddle carried by the lower end of the mixing shaft and adapted to revolve within the bowl and conforming generally in shaft and size to the interior of the bowl, the action of the stop flange serving to prevent the straight paddle from contacting with the inner surface of the mixing bowl, and manually operated speed increasing gearing connected to the mixing shaft to drive the same.

5. A dental device for mixing plaster of Paris or the like, comprising a rubber bowl having a yielding mouth, a cover for the bowl having a periphery for insertion within the yielding mouth and having elastic binding engagement therewith for affording a tight joint, said cover having a stop flange for limiting the extent of downward movement of the cover within the mouth of the bowl, a mixing shaft extending through the cover into the bowl, a mixing paddle secured to the mixing shaft and adapted to operate within the bowl, the action of the stop flange serving to prevent the paddle from contacting with the inner surface of the mixing bowl, and means to drive the mixing shaft at a relatively high speed for effecting a proper mixing action of the material.

6. A dental device for mixing plaster of Paris, or the like, comprising a flexible bowl having a yielding mouth, a cover for the bowl having a periphery for insertion within the yielding mouth and having yielding clamping engagement therewith to provide a tight joint, a mixing shaft carried by the cover and extending below the same, a mixing paddle secured to the mixing shaft and operating within the bowl, and conforming generally in shape and size to the interior of the bowl, so that its edge travels near the inner surface of the bowl, means to limit downward movement of the cover within the bowl so that the mixing paddle is retained out of contact with the mixing bowl, and means to turn the mixing shaft.

7. A dental device for mixing plaster of Paris or the like, comprising a rubber bowl having a yielding mouth, a cover for the bowl having a periphery adapted for insertion within said mouth, and having elastic binding action therewith for affording a tight joint, a paddle shaft carried by the cover, a paddle arranged beneath the cover and connected with the shaft and adapted to operate within the bowl said paddle conforming generally in shape and size to the interior of the bowl, and means to drive the shaft, the cover, paddle shaft and paddle being removable from the bowl as a unit.

8. A dental device for mixing plaster of Paris or the like, comprising a flexible bowl having its upper end open, a cover for the upper open end of the bowl and having telescoping engagement therewith, a paddle shaft carried by the cover, a paddle arranged beneath the cover and connected with the shaft and adapted to operate within the bowl, said paddle being relatively stiff and imperforate throughout the major portion of its area, said paddle also corresponding generally in shape and size to the interior of the bowl and held by the cover out of contact with the interior of said bowl, and means to drive the paddle shaft.

9. A dental device for mixing plaster of Paris or the like, comprising a flexible bowl having an upper open end, a cover detachably mounted upon the upper open end of the flexible bowl, a paddle shaft carried by the cover and a paddle arranged beneath the cover and connected with the shaft and adapted to operate within the bowl, said paddle being relatively stiff and having the major portion of its area imperforate and also corresponding generally in shape and size to the interior of the bowl and held by the cover out of contact with the interior of the bowl, and means to drive the paddle shaft.

In testimony whereof I affix my signature.

LOUIS C. BURGARD.